United States Patent [19]
Alferness

[11] Patent Number: 4,533,207
[45] Date of Patent: Aug. 6, 1985

[54] WAVELENGTH TUNABLE TE TO TM MODE CONVERTER

[75] Inventor: Rodney C. Alferness, Holmdel, N.J.

[73] Assignee: AT&T Bell Laboratories, Murray Hill, N.J.

[21] Appl. No.: 506,456

[22] Filed: Jun. 21, 1983

[51] Int. Cl.³ ............................................. G02B 5/14
[52] U.S. Cl. .............................. 350/96.14; 350/96.12
[58] Field of Search ........................... 350/96.12, 96.14

[56] References Cited

U.S. PATENT DOCUMENTS

| | | | |
|---|---|---|---|
| 4,273,411 | 6/1981 | Alferness | 350/96.14 |
| 4,384,760 | 5/1983 | Alferness | 350/96.14 |
| 4,448,479 | 5/1984 | Alferness | 350/96.13 X |

OTHER PUBLICATIONS

"Tunable Electro-Optic Waveguide TE<->TM Converter/Wavelength Filter", Alferness et al., App. Phys. Lett. 40(10), May 15, 1982.

"Long-Wavelength Ti:LiNbO₃ Waveguide Electro-Optic TE←→TM Convertor", Alferness et al., Electronics Letters, Jan. 20, 1983, vol. 19, No. 2.

Primary Examiner—William L. Sikes
Assistant Examiner—Akm E. Ullah
Attorney, Agent, or Firm—David R. Padnes

[57] ABSTRACT

An improved wavelength tunable TE to TM optical mode converter is provided by confining the electric fields for mode conversion and wavelength tuning to non-overlapping regions of a bi-refringent waveguide. Several electrode configurations for providing this spatial separation are disclosed.

8 Claims, 3 Drawing Figures

WAVELENGTH TUNABLE TE TO TM MODE CONVERTER

TECHNICAL FIELD

The present invention relates to integrated optics and, more particularly, to an electrooptic, wavelength tunable TE to TM optical mode converter.

BACKGROUND OF THE INVENTION

A TE to TM optical mode converter transforms the TE mode to the TM mode in a waveguide and vice versa. Such converters are used to fabricate a variety of integrated optical devices, such as wavelength filters and polarization transformers. Wavelength filters are important components for multiplexing/demultiplexing applications in lightwave systems. Polarization transformers, on the other hand, compensate for undesirable polarization changes in a transmitted optical signal with time and distance and are necessary for a class of interferometric signal processing techniques. Heterodyne detectors and fiber interferometers utilize such techniques and, therefore, require an optical signal polarized along a specified direction.

In one type of optical mode converter, an optical waveguide comprising a birefringent material is subjected to a predetermined electric field to attain TE to TM mode conversion. Although the mode conversion provided by this device is highly wavelength selective, it is also known that the wavelength of the mode converted can be tuned by the use of a second electric field applied to the optical waveguide. See, for example, U.S. Pat. No. 4,273,411 to applicant, dated June 16, 1981. While the use of a second electric field provides a considerable tuning range, the voltages required to establish the necessary electric fields for mode conversion and tuning are greater than is desirable for particular lightwave applications.

SUMMARY OF THE INVENTION

In accordance with the present invention, an improved wavelength tunable TE to TM optical mode converter is provided by confining the electric fields established for mode conversion and tuning to separate and nonoverlapping regions of an optical waveguide comprising birefringent material. This spatial separation provides a significant reduction in the supply voltages required for the mode conversion and tuning electric fields. In the disclosed embodiments, the spatial separation in electric fields is achieved through the use of a predetermined electrode configuration disposed about the optical waveguide.

DETAILED DESCRIPTION

Figure 1:
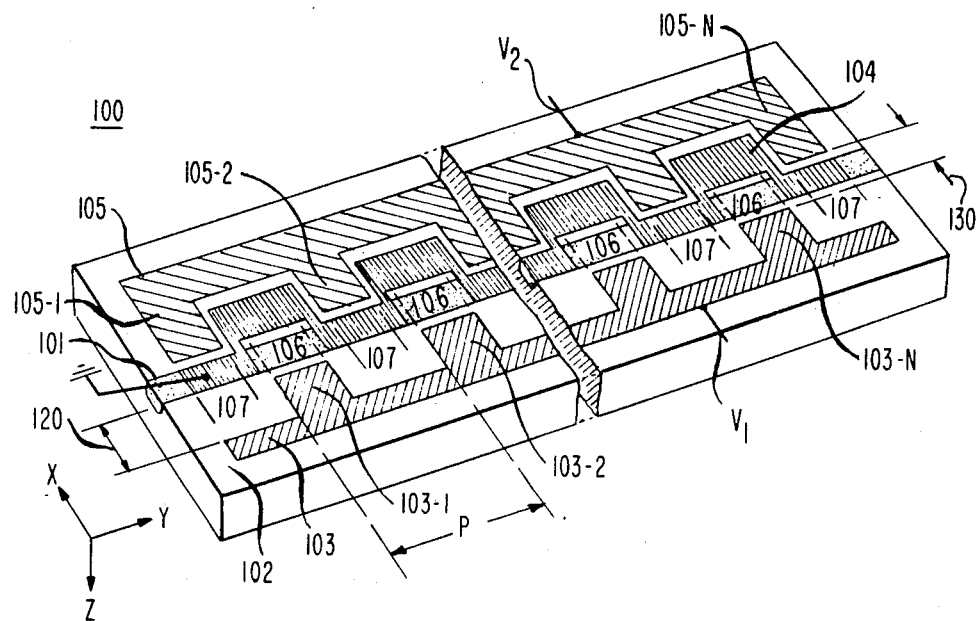
FIG. 1 is a foreshortened perspective view of a first embodiment of the present invention.

Referring to the drawings, FIG. 1 shows a first embodiment of a TE to TM optical mode converter 100 in accordance with the present invention. Converter 100 comprises a dielectric waveguide 101, which supports a single TE and TM mode, embedded in an electrooptic substrate 102 of lower refractive index. Waveguide 101 is fabricated of a birefringent material, such as titanium diffused lithium niobate or lithium tantalate, and for purposes of illustration, is Z-cut and Y-propagating.

As is known, mode conversion requires the application of a predetermined electric field to the waveguide. Efficient electrooptic TE to TM mode conversion in a waveguide comprising a birefringent material requires periodic coupling to achieve phase-matching between the nonsynchronous TE and TM mode. As a result, the mode conversion is highly wavelength selective and the phase-match wavelength $\lambda$ is a function of the waveguide birefringence and the electrode period P. This function can be expressed as:

$$2(\pi/\lambda)|N_{TE}-N_{TM}|=2(\pi/P) \qquad (1)$$

where $N_{TE}$ and $N_{TM}$ are the waveguide effective indices for the TE and TM modes, respectively. While the electrode period P cannot be changed once the mode converter is fabricated, a plurality of phase-match wavelengths can be accommodated by cascading a number of electrode sections wherein each section has an appropriate period for each phase-match wavelength. Generally, however, it is more desirable to provide adjustment or tuning of the phase-match wavelength by electrooptically altering the difference between the waveguide effective indices, $N_{TE}-N_{TM}$, by the application of a second predetermined electric field to the waveguide.

Pursuant to the present invention, an improved wavelength tunable TE to TM mode converter is achieved by establishing electric fields for mode conversion and tunability within separate and distinct regions of dielectric waveguide 101. As shown in FIG. 1, mode conversion is provided by electrodes 103 and 104 which are respectively connected to voltage $V_1$ and ground potential. Electrode 103 comprises a large number of fingers 103-1 through 103-N having a period P. Upon the application of voltage $V_1$, a periodic field is established within the waveguide. As discussed in the above-referenced U.S. patent to applicant, U.S. Pat. No. 4,273,411, the X component of the field couples to an off-diagonal electrooptic coefficient to realize the TE to TM conversion.

Tuning of the phase-match wavelength is provided through the use of electrodes 104 and 105, the latter being connected to reference voltage $V_2$. Electrode 105 comprises a large number of fingers 105-1 through 105-N. The number of fingers on electrodes 103 and 105 need not, of course, be equal. Fingers 105-1 through 105-N are interleaved with electrode fingers 104-1 through 104-N but otherwise need not satisfy any periodicity requirements. That is, any period of the tuning fingers which permits interleaving is acceptable. Preferably, however, the fingers on the mode converter and tuning electrodes should have the same dimension along the waveguide and each tuning finger should be centered between two adjacent mode converter fingers. The Z component of the field established by the potential difference between electrodes 104 and 105 provides for tuning of the phase-match wavelength. The relationship between tuning voltage and the phase-match wavelength shift is a known function of electrooptical crystal coefficients, substrate refractive index for each mode, gap between tuning and ground electrode and overlap between the Z component of the tuning electric field and the optical fields of the TE and TM modes. For further details, see an article by R. C. Alferness and L. L. Buhl, entitled "Tunable Electro-optic Waveguide TE<->TM Converter/Wavelength Filter," *Applied Physics Letters* 40(10), May 15, 1982, pp. 1861-862.

It should be noted that the fingers of electrode 103 along with the serpentine-like pattern of ground electrode 104 provides mode conversion in spaced waveguide regions 106 opposite each of the fingers 103-1 through 103-N. Mode conversion in regions 107 is negligible as there is a correspondingly small X component of the mode converting electric field in regions 107. In the embodiment of FIG. 1, the mode converting electric field is substantially eliminated in regions 107 by selecting the distance 120 between electrodes 103 and 104 to be large relative to the distance 130 between the ends of fingers 103-1 through 103-N and electrode 104. For example, a ratio of distance 120/distance 130 of 10 to 1 is appropriate. Similarly, the fingers of electrode 105 and the pattern of ground electrode 104 provide tuning in waveguide regions 107 opposite each of the fingers 105-1 through 105-N. It should be further noted that there is no tuning occurring in regions 106 due to the absence of a tuning electric field in these regions. Accordingly, each tuning region is separated from the immediately succeeding tuning region by a mode converting waveguide region. This spatial separation of electric fields advantageously provides an approximate 50% reduction in the required working voltages $V_1$ and $V_2$.

While the embodiment of FIG. 1 is suitable for titanium-diffused lithium niobate or lithium tantalate waveguides, the high birefringence of the former requires a very fine electrode period, e.g., 18 microns for a phase-match wavelength of 1.32 microns, and fringing electric field effects can cause undesirable interaction between the tuning and mode conversion. This interaction can be avoided by use of the electrode configurations of FIGS. 2 and 3.

Figure 2:
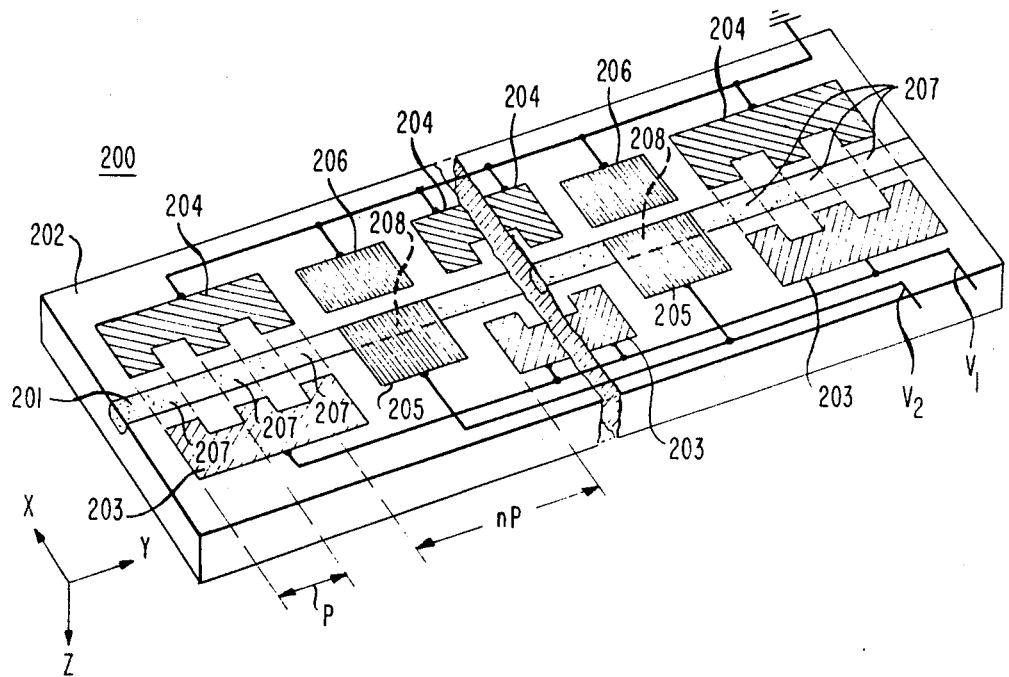
FIG. 2 is a foreshortened perspective view of a second embodiment of the present invention.

Referring now to FIG. 2, the second embodiment 200 of a TE to TM optical mode converter comprises a waveguide 201 of birefringent material which is embedded in an electrooptic substrate 202 of lower refractive index, as in FIG. 1. For illustrative purposes, waveguide 201 shall be assumed to be Z-cut and Y-propagating. Mode conversion is provided by a plurality of electrodes 203 and 204 which are respectively connected to voltage $V_1$ and ground. Electrodes 203 and 204 each comprise a plurality of fingers having period P with the fingers of electrodes 203 and 204 directly opposite one another. As a result, mode conversion occurs in waveguide regions 207 between each pair of opposing fingers on electrodes 203 and 204.

Tuning of the phase-match wavelength in converter 200 is provided by a plurality of electrodes 205 and 206, respectively connected to reference voltage $V_2$ and ground. Electrodes 205 and 206 are arranged into opposing pairs between successive sections of electrodes 203 and 204. Accordingly, the tuning electric field is confined in regions 208 of waveguide 201. It should be noted that corresponding finger portions on successive sections of electrodes 203 and 204 must be in phase. In FIG. 2, the distance between such corresponding portions in nP, where n is an integer and P is the period of the mode converter electrode. It should be noted that effective tuning in the FIG. 2 embodiment necessitates cascading many alternating mode converting and tuning electrode elements. For example, 20 or more distinct sections of each of electrodes 203 through 206 are preferable.

Figure 3:
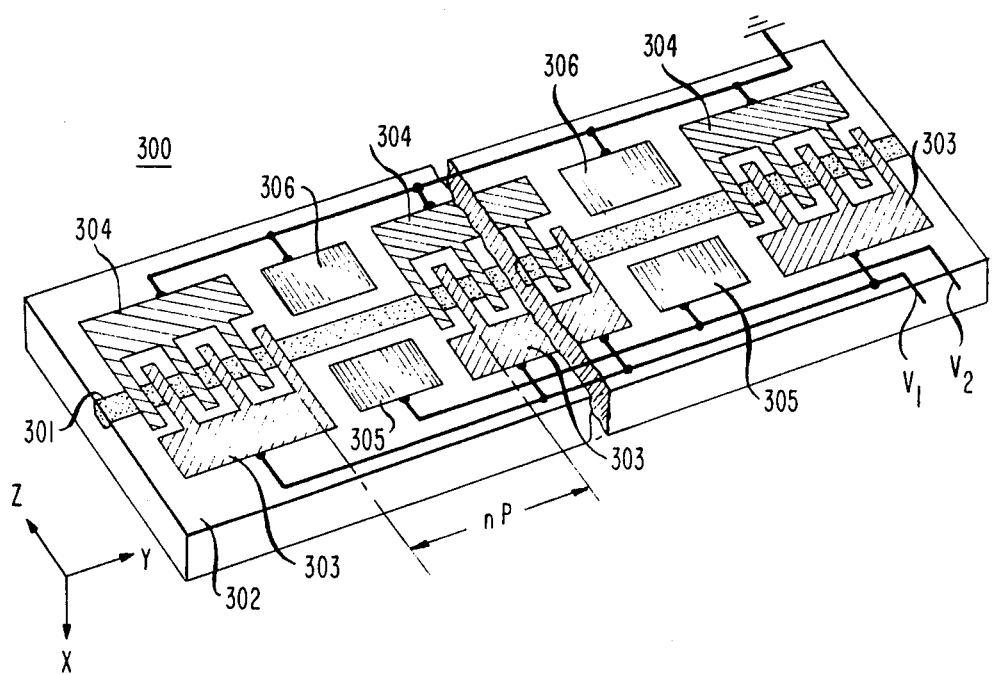
FIG. 3 is a foreshortened perspective view of a third embodiment of the present invention.

FIG. 3 shows an electrode configuration in a third embodiment 300 of the present invention which provides spatially separated mode converting and tuning electrode fields. The structure of waveguide 301 and substrate 302 are identical to that described previously except that the birefringent waveguide material is X-cut and Y-propagating. Electrodes 303 and 304 which provide mode conversion are respectively connected to voltages $V_1$ and ground and have interdigital fingers. Tuning is provided by electrodes 305 and 306 disposed in an opposing relationship between successive sets of electrodes 303 and 304. Therefore, mode conversion occurs in the waveguide regions under the interdigital fingers of electrodes 303 and 304 due to the X component of the electric field formed between these electrodes. In addition, tuning occurs in the waveguide regions between electrodes 305 and 306 in response to the Z component of the electric field therebetween. As in FIG. 2, while the dimension of electrodes 305 and 306 along the waveguide can be varied, the period of the mode conversion electrode fingers must be maintained for efficient mode converter operation at the phase-match wavelength.

While the foregoing description has been primarily directed to the illustrative embodiments, it should, of course, be understood to those skilled in the art that electrooptic birefringent materials other than titanium diffused lithium niobate or lithium tantalate may be employed for the waveguide element. Moreover, other crystal orientations may be used, as is known in the art. For example, any crystal cut and electric field which couples to an off-diagonal element of the electrooptic tensor can be used for mode conversion along with an appropriate tuning electric field which electrooptically alters the difference between the waveguide effective indices, $N_{TE}-N_{TM}$. Finally, it will be appreciated that the present wavelength tunable TE to TM mode converter can be readily incorporated in a wavelength filter or a polarization transformer as respectively disclosed by applicant's U.S. Pat. Nos. 4,273,411 and 4,384,760.

What is claimed is:

1. A wavelength tunable TE to TM optical mode converter comprising
   a birefringent waveguide capable of guiding TE and TM optical signal modes;
   means for converting from one of said signal modes to the other at a preselected wavelength by providing a first electric field in first spatially separated regions of said waveguide; and
   means for shifting said preselected wavelength by providing a second electric field which is substantially confined to second regions of said waveguide which do not overlap said first regions.

2. The mode converter of claim 1 wherein said birefringent waveguide comprises titanium diffused lithium tantalate.

3. The mode converter of claim 1 wherein said birefringent waveguide comprises titanium diffused lithium niobate.

4. The mode converter of claim 1 wherein said mode converting means comprises an electrode structure having a predetermined period.

5. The mode converter of claim 4 wherein said wavelength shifting means comprises a second electrode structure which is interleaved with said first electrode structure.

6. The mode converter of claim 1 wherein said first and second regions are disposed in a predetermined sequence.

7. The mode converter of claim 1 wherein said first and second regions alternate along said waveguide.

8. A method of providing wavelength tunable TE to TM optical mode conversion comprising the steps of establishing a first electric field in first spatially separated regions of a birefringent waveguide capable of guiding TE and TM optical signal modes, and establishing a second electric field in second regions of said waveguide which do not overlap said first regions.

* * * * *